United States Patent [19]

Schafer

[11] 3,957,381

[45] May 18, 1976

[54] COAXIAL, DOUBLE-CONE, FRICTIONAL HUB-TO-SHAFT CONNECTOR

[75] Inventor: Horst-Dieter Schäfer, Willich, Germany

[73] Assignee: Ringfeder GmbH, Krefeld-Uerdingen, Germany

[22] Filed: Apr. 30, 1975

[21] Appl. No.: 572,351

[30] Foreign Application Priority Data
Sept. 14, 1974 Germany............................ 2444104

[52] U.S. Cl............................... 403/16; 403/369; 403/374
[51] Int. Cl.²...................... B25G 3/00; E21B 19/16; F16D 1/00
[58] Field of Search........... 403/368, 369, 370, 371, 403/374, 314, 16; 285/249, 255, 323, 421

[56] References Cited
UNITED STATES PATENTS

| | | |
|---|---|---|
| 3,717,367 | 2/1973 | Peter et al. ..................... 403/371 X |
| 3,751,941 | 8/1973 | Stiff..................................... 64/30 E |
| 3,847,493 | 11/1974 | Peter et al. ..................... 403/371 X |
| 3,849,015 | 11/1974 | Peter et al. ..................... 403/371 X |

FOREIGN PATENTS OR APPLICATIONS

| | | |
|---|---|---|
| 643,631 | 8/1962 | Italy..................................... 285/323 |
| 2,032,969 | 1/1972 | Germany............................ 403/369 |

Primary Examiner—Andrew V. Kundrat
Assistant Examiner—Wayne L. Shedd
Attorney, Agent, or Firm—Michael J. Striker

[57] ABSTRACT

The connector includes a flanged clamping ring and an unflanged clamping ring. One ring is received within the other. Tightening screws tighten the connector by drawing the rings together in axial direction. Each ring has an inner and an outer surface. The inner surface of the outer ring and the outer surface of the inner ring are conical surfaces which engage each other when the rings are drawn together in axial direction. The other surface of at least one of the rings is a clamping surface adapted to engage with a clamp action a complementarily configured surface of a shaft or collar when the rings are drawn together in axial direction. The unflanged ring at the axial end thereof facing towards the flange is provided, intermediate the inner surface of the unflanged ring and the outer surface of the unflanged ring, with an inclined conical intermediate surface. The flange has an inner surface which faces towards and is substantially parallel to the inclined conical intermediate surface of the unflanged ring.

23 Claims, 7 Drawing Figures

COAXIAL, DOUBLE-CONE, FRICTIONAL HUB-TO-SHAFT CONNECTOR

BACKGROUND OF THE INVENTION

The invention relates to clamp-action connectors which utilize the force of friction to connect together a shaft and a component surrounding the shaft, such as a concentric collar or the like.

More particularly, the invention relates to clamp-action connectors comprised of at least two rings which are configurated as closed rings or as axially slit rings or as combined closed-slit rings provided with cylindrical faces on the surfaces thereof facing the shaft or the collar. Still more particularly, the rings of such a clamp-action connector are provided with conical surface portions which are drawn together in axial direction by means of tightening screws so as to bring about a clamping engagement, with one of the rings being provided with a flange for effecting such drawing together of the two rings during tightening.

A clamp-action connector comprised of rings somewhat similar to those described above is already known from German Pat. No. DT-PS 1,949,512. The connector is insertable between a shaft and a second component arranged concentrically surrounding the shaft. In this known construction, the function of the aforementioned flange on one of the two rings is taken over by a discrete third ring arranged in front of the inner ring and operative for providing a supplemental centering action.

Another somewhat similar clamp-action connector is disclosed in German published Pat. No. DT-OS 2,144,522. This connector is comprised of an inner ring provided with a radial flange having a plurality of tightening-screw bores and threaded bores for release screws, and the connector is further comprised of an outer ring. With this connector, especially when high torques are to be transmitted, the high surface pressures which develop on the collar side of the connection are very disadvantageous.

SUMMARY OF THE INVENTION

It is a general object of the invention to provide a clamp-action connector of the general type in question which is improved over the prior-art constructions referred to above.

It is another object to provide a connector which, compared to the prior-art constructions referred to above, is improved with respect to the development of surface pressure on the contacting surfaces of the connector, shaft and collar, and with respect to the length of that part of the connector which actually provides clamping action and torque transmission.

It is another object of the invention to provide a connector which can be reliably used in conjunction with thin-walled collars and/or with shafts (e.g., hollow shafts) not able to withstand very great pressures.

These objects, and others which will become more understandable from the description, below, of preferred embodiments, can be met, according to one advantageous but merely exemplary concept of the invention, by so configurating the unflanged ring that its cylindrical surface, considered in axial direction, extends farther towards the flange of the flanged ring than does the conical clamping surface of the unflanged ring. At the end of the unflanged ring facing the flanged ring there is provided an inclined conical intermediate surface, located intermediate the aforementioned cylindrical and conical surfaces on the unflanged ring. Advantageously the inner surface portion of the flange, i.e., the surface portion which faces towards the unflanged ring, is inclined at least approximately parallel to the aforementioned inclined conical intermediate surface.

In this way, the inventive expedient can also be utilized when the flanged ring is not a single part but is subdivided into an unflanged ring portion and a flange portion, or into an unflanged ring portion and a supplementary flanged ring portion, i.e., when the clamp-action connector is essentially comprised of three cooperating rings instead of two.

According to the inventive concept the flanged ring can be the outer ring with the unflanged ring being the inner ring; i.e., the flanged ring can surround the unflanged ring. Alternatively, the unflanged ring can be the outer ring and surround the flanged ring.

According to a further concept of the invention, the unflanged ring can be mirror symmetrical with respect to a plane normal to the rotation-symmetry axis thereof; for example, the unflanged ring can be double-conical in configuration. In such event, there can be provided two conical flanged rings, inserted into the unflanged ring from opposite sides thereof, or pushed from the opposite sides the opposite ends of the unflanged ring, with correspondingly longer tightening screws being employed for effecting tightening of such double-conical three-ring connector.

To simplify manufacture of the connector, and furthermore to achieve an improved transmission of force at that portion of the flanged ring where the flanges merges into the conical clamping surface, it is contemplated according to the invention to provide the flanged region at such portion with an axially extending portion, i.e., with a portion which is cylindrical and concentric to the axis of the connector, and located intermediate the inner face of the flange on the flanged ring and the conical clamping surface of the flanged ring, with the transition between such axially extending portion and the inner face of the flange exhibiting a radius of curvature, when viewed in axial section.

According to another concept of the invention, the flange of the flanged ring, in per se known manner, is provided with at least two threaded bores for receiving release screws which, for facilitating release of the connector, press against correspondingly positioned support surfaces on the unflanged ring, these support surfaces lying in planes normal to the symmetry axis of the connector, and the pressing of the ends of the release screws against such support surfaces serving to cause the two rings to move axially away from each other, to release the clamping action.

To further reduce the cost of manufacture of the flanged ring, the invention contemplates the possibility that the flanged ring is shaped without cutting, but instead by casting, forging, or the like, and that, besides the bores provided for the release screws and for the tightening screws, only the cylindrical and conical clamping surfaces of the flange ring are formed by cutting or other material removal technique. This expedient results in a particularly form-stable connection of the flange to the remainder of the flanged ring, when the flanged ring is a unitary member, on account of the organic structure of the grain of the uncut material.

Similarly, it is also contemplated to perform the unflanged ring without cutting, i.e., instead by casting, forging, or the like, with material-removal cutting being employed, besides for the forming of the bores for the tightening screws, only for working the cylindrical and conical clamping surfaces of such unflanged ring.

Compared to clamp-action connectors of the prior art, clamp-action connectors embodying one or more of the concepts of the present invention can if desired be made to exhibit one or more of the following advantages:

When the connector is so constructed and the connector, shaft and collar so arranged relative to each other, that the transmission of force is from the collar to the unflanged ring to the flanged ring to the shaft, or in the reverse sequence, and when the same axial length is used for the inventive clamp-action connector as one would use for a comparable prior-art clamp-action connector, and when the same torque is transmitted by the comparably dimensioned prior-art clamp-action connector, there results a marked decrease in the surface pressure exerted upon the clamped surface of the collar of the inventive connector. This creates the possibility of decreasing the diameter of the collar, since less strength is required from the collar; this is advantageous in terms of weight reduction and in terms of manufacturing economy. Likewise, if an inventive clamp-action connector is given the same axial length as a prior-art clamp-action connector, with the amount of surface pressure allowed to be applied to the clamped surface of the collar being the same for both connectors, a markedly higher torque can be transmitted.

When the connector is so constructed and the connector, shaft and collar so arranged relative to each other, that the transmission of force is from the collar to the flanged ring to the unflanged ring to the shaft, or in the reverse sequence, then if the inventive connector has the same axial length as a comparable prior-art connector, and if the same torque is to be transmitted as with the prior-art connector, the surface pressure to which the clamped surface of the shaft is subjected can be reduced relative to that developed when the comparable prior-art connector is used. This makes it possible to more advantageously construct the shaft; for example, the lesser strength required of the shaft makes possible the use of a different material and/or a larger inner diameter in the case of a hollow shaft.

Likewise, if the inventive connector and the comparable prior-art connector have the same axial length, and if the use of each is such as to result in the development of the same amount of surface pressure exerted upon the clamped surface of the shaft, there results an increase in the normal force and accordingly in the torque which can be transmitted.

With respect to the just-described advantages, relative to a comparable prior-art connector, it is noted that these advantages can be achieved with the overall volume of the inventive connector and the comparable prior-art connector being the same, which in itself can be considered a further advantage.

Finally, and similarly to the foregoing, if the surface pressure which is to be allowed to develop and also the torque which is to be transmitted are kept unchanged, relative to their values in the case of a comparable prior-art connector, the inventive connector can be made of markedly shorter axial length than the comparable prior-art connector. This is of considerable significance, for example, in situations where a connector must be provided to effect a connection between a shaft, on the one hand, and an already existing collar of short axial length, on the other hand.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
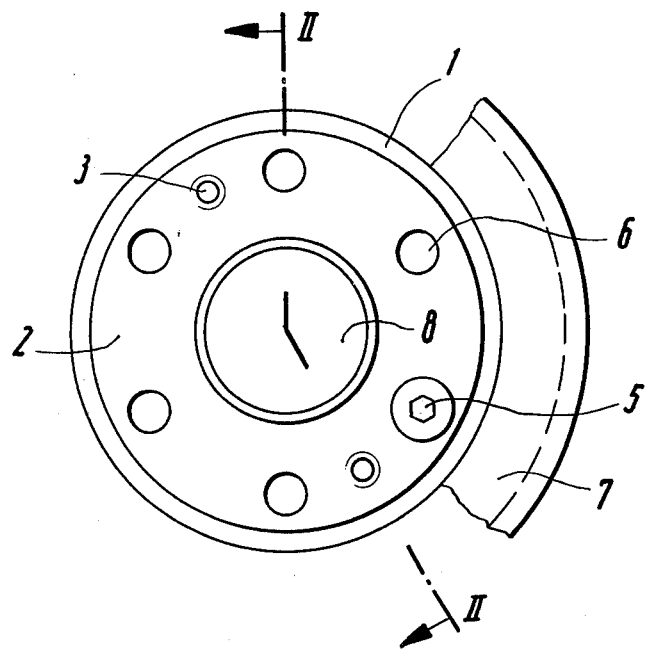
FIG. 1 is an axial end view of a first inventive connector connecting together with a clamp-action a thin-walled collar and a shaft surrounded by the collar.
Figure 2:
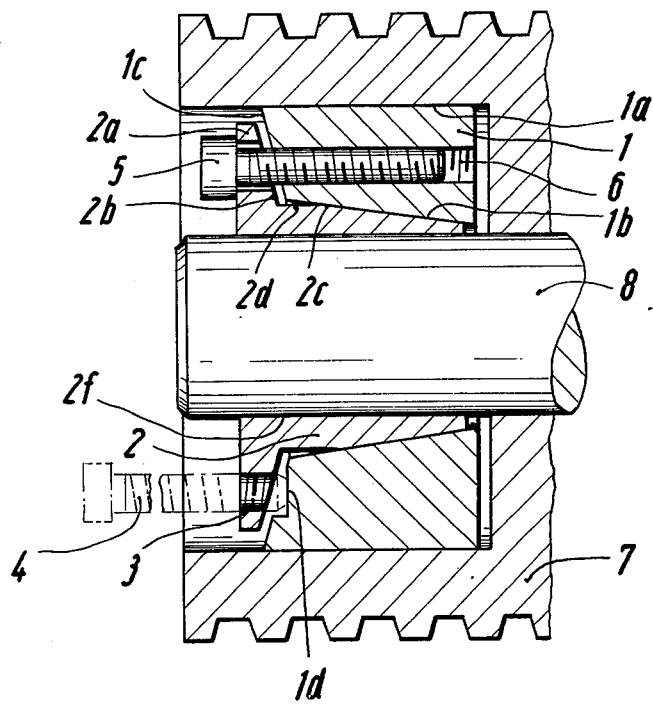
FIG. 2 is a section taken along line II—II in FIG. 1.

In FIGS. 1 and 2, the clamp-action connector is comprised of a ring 2 having a flange 2a and an unflanged ring 1. In this embodiment, the unflanged ring 1 surrounds the flanged ring 2, whereas the relationship is reversed in some of the other embodiments. The ring 2 is received in the cylindrical recess of a collar 7, here a V-belt pulley, with the ring 2 surrounding a shaft 8 to be connected to the pulley. The clamp-action connector is further provided with planetarily arranged tightening screws 5. These screws 5 pass through corresponding bores 6 in the flange 2a and in the ring 1. When the tightening screws 5 are turned for tightening, the respective conical surfaces 1b, 2c of the rings 1, 2 cause the cylindrical surfaces 1a, 2f of the rings to become respectively clamped against the internal circumferential wall of the collar 7 and against the circumferential surface of the shaft 8. The cylindrical surface 1a of the ring 1, as considered in axial direction, extends farther towards the flange 2a of the flanged ring 1 than does the conical surface 1b of the ring 1. The unflanged ring 1, at the end thereof facing towards the flange 2a of ring 2, is provided with an inclined conical intermediate surface 1c located between the cylindrical surface 1a on ring 1 and the conical surface 1b on the ring 1. In order that full use be made of the axial tightening distance, the inner inclined conical surface 2b of the flange 2a is arranged substantially parallel to the aforementioned inclined conical intermediate surface on ring 1. In order to avoid wedging at the transition from inner surface 2b to conical surface 2c during the tightening of the connector, there is provided in this embodiment an intermediate surface 2d which is parallel to the longitudinal axis of the illustrated structure.

In order to make for easy unlocking of the connector, particularly when the connector is designed to be self-locking, there is provided opposite each threaded bore in the flange 2a a respective vertical support surface 1d on the ring 1, the support surfaces 1d being pressed upon by the release screws 4 (shown in dash-dot lines) during unlocking of the connector. Advantageously, the tightening screws 5 thermselves can be used as the release screws.

Figure 3:
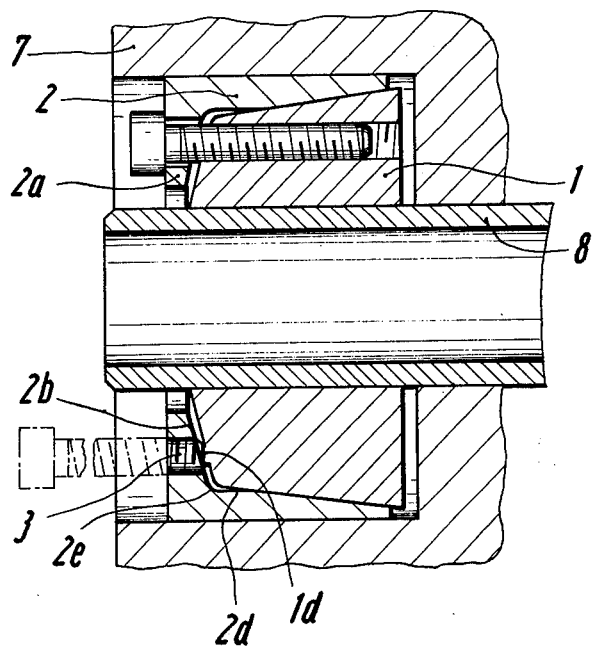
FIG. 3 is a section through a second inventive connector, taken along a section line corresponding to section line II—II in FIG. 1.

The connector of FIG. 3 is mounted on and surrounds a hollow shaft. In this connector, the flanged ring 2 surrounds the unflanged ring 1. The ring 1 is provided with raised vertically oriented supporting surfaces 1d against which the ends of the release screws press when the connector is being unlocked. However, in this embodiment, in order to keep as large as possible the axial tightening distance, the supporting surfaces 1d do not extend radially outwards as far as do the oppositely located bores 3 in the flange 2a of the ring 2, which latter presses against the inner circumferential wall of the collar 7. The transition portion intermediate the axially oriented surface 2d on the ring 2 and the inner surface 2b of the flange 2a has a radius 2e. Further details of the structure in FIG. 3 correspond to those of the structure of FIGS. 1 and 2.

Figure 4:
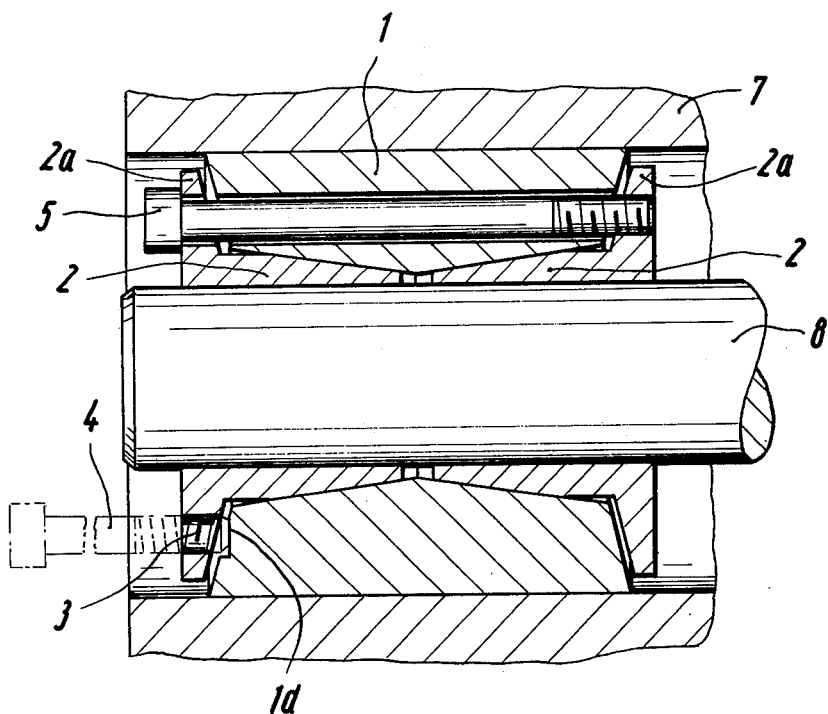
FIG. 4 is a section through a third inventive connector of double-conical configuration, configurated mirror symmetrical with respect to a plane normal to the symmetry axis thereof, with the section line corresponding to section line II—II in FIG. 1.
Figure 5:
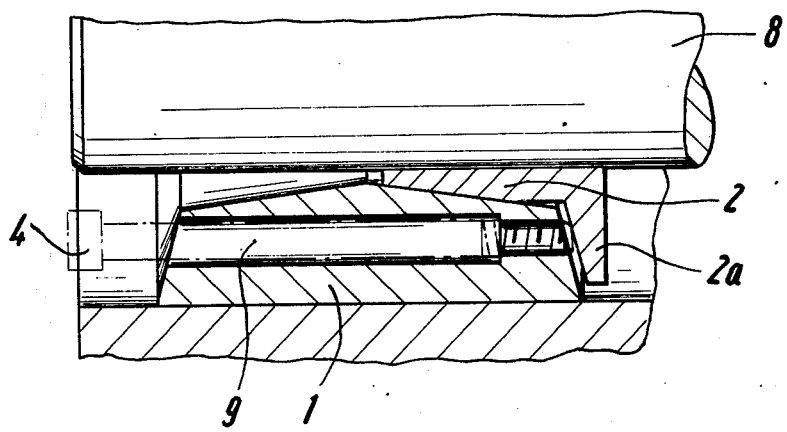
FIG. 5 is a section, along a different section line, through the lower half of the embodiment of FIG. 4, to illustrate how disassembly of the double-conical connector of FIG. 4 can be performed.

In FIGS. 4 and 5, the connector is double-conical and is inserted between the shaft 8 and the collar 7. It is comprised of an outer unflanged double-conical ring 1, two inner rings 2 provided with respective flanges 2a, and tightening screws 5 engaging the rings 2. To facilitate release of the ring 2 located on the shaft end (the left ring 2), the flange 2a of that ring is again provided with threaded bores 3 for release screws 4, the ends of which again act against support surfaces 1d on the ring 1. As shown in FIG. 5, for effecting release of the other ring 2 (the right ring 2), there are provided in the ring 1 through-bores 9 which are smooth or unthreaded at their left sides, so that the right ring 2 can be released by means of lengthier release screws 4 which bear against the inner surface of flange 2a of the right ring 2.

Figure 6:
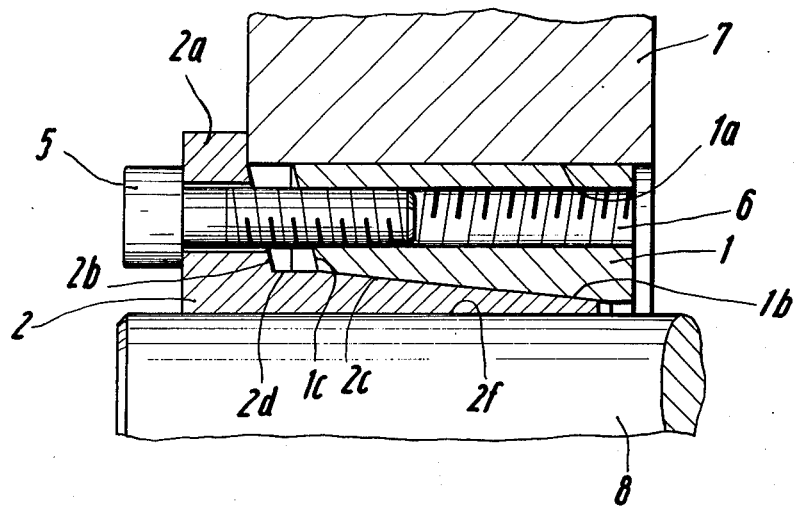
FIG. 6 depicts a modification of the embodiment of FIGS. 1 and 2.

The connector of FIG. 6 is characterized by the presence of means for locating the connector at a precise axial location relative to the collar 7. In particular, the flange 2a of the ring 2 projects radially outwards beyond the outer circumference of the unflanged ring 1. In this way, when the tightening screw 5 is turned, to cause ring 1 to be drawn leftwards, the flange 2a will bear against a support surface on the collar 7. It will be clear that the axial position assumed by ring 2 at the start of assembly, when its flange 2a comes into abutment against the side surface of collar 7, will be maintained with a high degree of accuracy after the connector has been fully tightened; additionally, the expedient of FIG. 6 results in a particularly well centered and perpendicular position of the hub 7 relative to the shaft 8, ensuring high accuracy in the running of the rotary components being connected.

Figure 7:
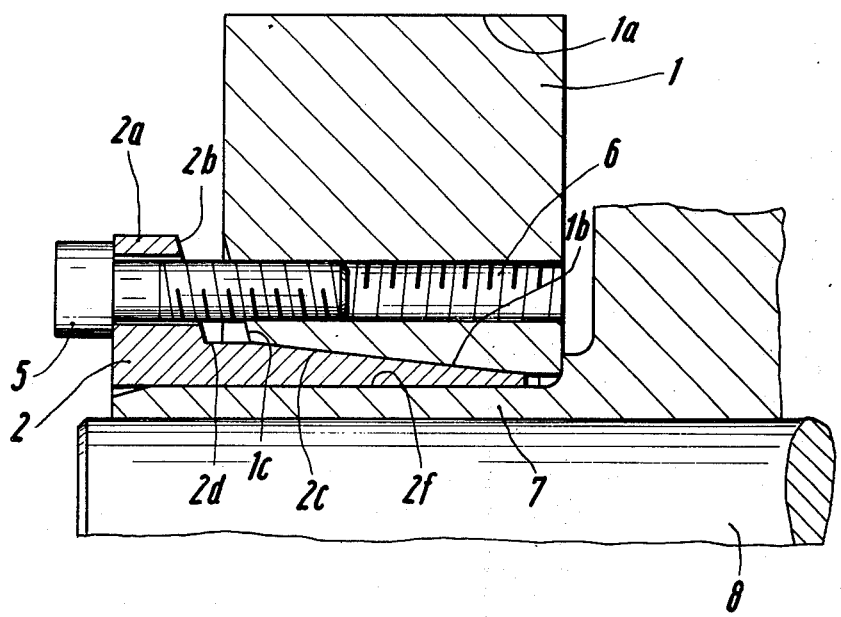
FIG. 7 depicts a further modification of the connector shown in FIGS. 1 and 2, the connector of FIG. 7 being arranged on and surrounding a thin-walled axially extending projection of a collar.

In FIG. 7, the connector surrounds not only the shaft 8 but also a relatively thin-walled leftwards extending axial projection of the hub 7. The thinness of the projection corresponds to the stresses developed in the connection. When the tightening screws 5 are turned, the connector compresses this projection radially inwards onto and against the shaft 8. The oppositely acting reaction forces are taken up by the unflanged ring 1, which is appropriately dimensioned for that purpose.

The parts in FIGS. 6 and 7 not mentioned correspond to those parts in FIGS. 1 and 2 bearing the same reference numerals.

I claim:

1. A clamp-action connector for establishing a frictional connection between a shaft and a collar concentric to the shaft, comprising, in combination, a flanged clamping ring having a radial flange, an unflanged clamping ring, one of said rings being received within the other; and tightening means for tightening the connector by drawing said rings together in axial direction, each of said rings having an inner surface and an outer surface, the inner surface of the outer ring and the outer surface of the inner ring being conical surfaces which engage each other when said rings are drawn together in axial direction, the other surface of at least one of said rings being a clamping surface adapted to engage with a clamp action in a complementarily configurated surface of a shaft or collar when said rings are drawn together in axial direction, said unflanged ring at the axial end thereof facing towards said flange being provided intermediate said inner surface of said unflanged ring and said outer surface of said unflanged ring with an inclined conical intermediate surface, and said flange having an inner surface which faces towards and is substantially parallel to said inclined conical intermediate surface of said unflanged ring.

2. A connector as defined in claim 1, said outer surface of said unflanged ring being a cylindrical surface concentric with the axis of the connector, and wherein said cylindrical surface of said unflanged ring at the end of said first ring which faces towards said flange extends in axial direction farther towards said flange than does said conical inner surface of said first ring.

3. A connector as defined in claim 2, wherein said clamping surface is said cylindrical surface.

4. A connector as defined in claim 1, wherein said inner surface of said inner ring and said outer surface of said outer ring are cylindrical clamping surfaces adapted to engage with a clamp action correspondingly dimensioned cylindrical surfaces of a shaft and of a collar, respectively, when said rings are drawn together in axial direction.

5. A connector as defined in claim 2, wherein said inner surface of said inner ring and said outer surface of said outer ring are cylindrical clamping surfaces adapted to engage with a clamp action correspondly dimensioned cylindrical surfaces of a shaft and of a collar, respectively, when said rings are drawn together in axial direction.

6. A connector as defined in claim 1, wherein said flanged ring is a unitary member.

7. A connector as defined in claim 1, wherein said flanged ring is a unitary member and wherein said unflanged ring is a unitary member.

8. A connector as defined in claim 1, wherein one of said rings is a closed ring.

9. A connector as defined in claim 1, wherein both of said rings are closed rings.

10. A connector as defined in claim 1, wherein one of said rings is comprised of two discrete annular parts.

11. A connector as defined in claim 1, wherein said tightening means comprises a plurality of tightening screws each passing at least part way through said flange of said flanged ring and at least part way through said unflanged ring for drawing said rings together in axial direction to tighten the connector.

12. A connector as defined in claim 11, wherein said screws are arranged planetarily around the axis of the connector.

13. A connector as defined in claim 1, wherein the one of said engaging conical surfaces which is located on said flanged ring is adjoined on said flanged ring by a cylindrical continuation surface concentric with the axis of the connector, and wherein said flanged ring is provided intermediate said inner surface thereof and said cylindrical continuation surface thereof with a transition surface which exhibits a radius of curvature when said flanged ring is viewed in axial section.

14. A connector as defined in claim 1, wherein said flange is provided with at least two threaded through-bores through which can be threaded release screws for causing said rings to move apart in axial direction to release the connector, said unflanged ring at the axial end thereof facing towards said flange being provided with a support surface lying in a plane normal to the axis of the connector, said support surface serving as an abutment against which the ends of such release screws press when the connector is being released.

15. A connector as defined in claim 11, wherein said rings are provided with screw-receiving bores, and wherein said flanged ring is a body in which only said bores and said inner and outer surfaces are formed by material removal.

16. A connector as defined in claim 11, wherein said rings are provided with screw-receiving bores, and wherein said unflanged ring is a body in which only said bores and said inner and outer surfaces are formed by material removal.

17. A connector as defined in claim 11, wherein said rings are provided with screw-receiving bores, and wherein said rings are bodies in which only said bores and said inner and outer surfaces are formed by material removal.

18. A connector as defined in claim 1, wherein said unflanged ring surrounds said flanged ring.

19. A connector as defined in claim 1, wherein said flanged ring surrounds said unflanged ring.

20. A connector as defined in claim 18, wherein said flange extends in radially outwards direction.

21. A connector as defined in claim 19, wherein said flange extends in radially inwards direction.

22. A connector as defined in claim 1, wherein said unflanged ring is a double-conical ring mirror symmetrical with respect to a symmetry plane which is normal to the axis of the connector, wherein said flanged ring constitutes a first flanged ring engaging said double-conical unflanged ring at one axial side thereof, and further including a second flanged ring engaging said double-conical unflanged ring at the other axial side thereof, said first and second flanged rings being generally mirror symmetrical with respect to each other and being disposed generally mirror symmetrical with respect to each other, considered relative to said symmetry plane.

23. A connector as defined in claim 2, wherein said unflanged ring is a double-conical ring mirror symmetrical with respect to a symmetry plane which is normal to the axis of the connector, wherein said flanged ring constitutes a first flanged ring engaging said double-conical unflanged ring at one axial side thereof, and further including a second flanged ring engaging said double-conical unflanged ring at the other axial side thereof, and first and second flanged rings being generally mirror symmetrical with respect to each other being disposed generally mirror symmetrical with respect to each other as considered relative to said symmetry plane.

* * * * *